United States Patent
Mosaner et al.

(10) Patent No.: US 9,889,863 B2
(45) Date of Patent: Feb. 13, 2018

(54) GANGWAY BETWEEN TWO ARTICULATELY CONNECTED VEHICLES

(71) Applicant: Hübner GmbH & Co. KG, Kassel (DE)

(72) Inventors: Knud Mosaner, Kassel (DE); Marc Heinrich, Shanghai (CN)

(73) Assignee: Hübner GmbH & Co. KG, Kassel (DE)

( * ) Notice: Subject to any disclaimer, the term of this patent is extended or adjusted under 35 U.S.C. 154(b) by 90 days.

(21) Appl. No.: 15/054,353

(22) Filed: Feb. 26, 2016

(65) Prior Publication Data

US 2016/0251020 A1   Sep. 1, 2016

(30) Foreign Application Priority Data

Feb. 26, 2015 (EP) .................................... 15156706

(51) Int. Cl.
*B60D 5/00* (2006.01)
*B61D 17/22* (2006.01)

(52) U.S. Cl.
CPC ............. *B61D 17/22* (2013.01); *B60D 5/003* (2013.01)

(58) Field of Classification Search
CPC .......... B61D 17/22; B60D 5/00; B60D 5/003; B60D 5/006
USPC .......................................................... 105/18
See application file for complete search history.

(56) References Cited

U.S. PATENT DOCUMENTS

| | | | | |
|---|---|---|---|---|
| 1,450,007 | A * | 3/1923 | Pflager .................. | B61D 17/22 105/18 |
| 4,690,421 | A * | 9/1987 | Schmidt ................ | B61D 17/22 105/18 |
| 4,860,665 | A * | 8/1989 | Schmidt ................ | B29C 71/04 105/18 |
| 5,033,395 | A * | 7/1991 | Bechu .................... | B61D 1/06 105/18 |
| 5,456,186 | A * | 10/1995 | Hubner ................. | B61D 17/22 105/18 |
| 6,926,344 | B2 * | 8/2005 | Koch ..................... | B61D 17/22 105/15 |
| 7,392,748 | B2 * | 7/2008 | De Antonio ........... | B61D 17/22 105/8.1 |

(Continued)

FOREIGN PATENT DOCUMENTS

DE       4127535 A1    2/1993
DE    20 2013 000 165 U1    4/2013
(Continued)

OTHER PUBLICATIONS

European Search Report issued in co-pending application No. EP15156706, dated Aug. 28, 2015.
(Continued)

*Primary Examiner* — Jason C Smith
(74) *Attorney, Agent, or Firm* — Dinsmore & Shohl LLP

(57) ABSTRACT

A gangway between two articulately connected vehicles includes at least one bellows enveloping a gangway system to form a tunnel. The bellows has several tunnel-shaped circumferential bellows frames for forming corrugations or folds. The bellows has spacers, in the floor or roof area. The spacers are disposed between individual bellows frames and between a bellows frame and a fixed point connected to the respective vehicle.

9 Claims, 2 Drawing Sheets

(56) References Cited

U.S. PATENT DOCUMENTS

| | | | | |
|---|---|---|---|---|
| 8,869,706 B2* | 10/2014 | Koukal | ............... | B60D 5/00 105/15 |
| 2006/0174958 A1* | 8/2006 | Koch | ............... | B61D 17/22 138/121 |
| 2014/0191494 A1* | 7/2014 | Junke | ............... | B61D 17/22 280/403 |
| 2016/0046161 A1* | 2/2016 | Piacsek | ............... | B60D 5/00 280/403 |
| 2016/0121910 A1* | 5/2016 | Smith | ............... | B60D 5/003 105/15 |

FOREIGN PATENT DOCUMENTS

| | | | | | |
|---|---|---|---|---|---|
| EP | 2455242 | A1 | * | 5/2012 | ............ B60D 5/003 |
| EP | 2604451 | A1 | * | 6/2013 | ............ B60D 5/003 |
| EP | 2604451 | A1 | | 6/2013 | |
| EP | 2832562 | A1 | * | 2/2015 | ............ B60D 5/003 |
| EP | 2832562 | A1 | | 2/2015 | |
| EP | 2942214 | A1 | * | 11/2015 | ............ B61D 17/22 |
| EP | 3061632 | A1 | * | 8/2016 | ............ B60D 5/003 |
| GB | 2337239 | A | * | 11/1999 | ............ B60D 5/003 |
| GB | 2337239 | A | | 11/1999 | |
| RU | 2161575 | C2 | | 1/2001 | |

OTHER PUBLICATIONS

Russian Search Report issued in co-pending application No. RU2016106853/11, dated Apr. 19, 2017.

* cited by examiner

GANGWAY BETWEEN TWO ARTICULATELY CONNECTED VEHICLES

CROSS-REFERENCE TO RELATED APPLICATION

This application claims priority of European Patent Application EP 15 156706.2 filed Feb. 26, 2015, the entire content of which is incorporated herein in its entirety.

FIELD OF INVENTION

The invention relates to a gangway between two articulately connected vehicles, comprising at least one bellows enveloping a gangway system in the manner of a tunnel, wherein the bellows comprises several circumferential bellows frames, also tunnel-shaped, for forming corrugations or folds.

BACKGROUND OF THE INVENTION

A gangway of the afore-mentioned type between articulately joined vehicles, e.g. articulated busses or rail vehicles such as e.g. tramways, is well known from the prior art. Such a gangway customarily comprises a bellows that features a so-called gangway system, for example a bridge or a platform extending between the two vehicles, which it envelops in the manner of a tunnel. Such a bellows can be designed as a folded bellows or corrugated bellows. In both cases, discrete strips of a reinforcement coated with an elastomer are clamped by tunnel-shaped, circumferential, cross-sectionally U-shaped bellows frames for forming the folds or corrugations of folding or corrugated bellows.

However, folding bellows, in particular, can have a great or a smaller fold height. This means that there are, more specifically, folding bellows, which, while having a reduced number of folds, have folds characterized by a great fold depth in order to achieve a great expansion width. Now, it has been observed that in the mounted state of such bellows with a great fold depth, the bellows frames of the individual folds do not run substantially at the same distance from one another, but rather that the bellows frames are spaced at significantly varying distances in the roof area. As a result, such bellows are subject to increased wear, more specifically in the area of their corners, due to friction between the folds.

The same applies to so-called corrugated bellows, albeit to a lesser extent.

SUMMARY OF THE INVENTION

The problem underlying the invention is now to reduce the wear of folds or corrugations of a folding or corrugated bellows caused by friction between the individual folds or corrugations, more specifically in the corner area.

In order to solve the problem, it is proposed according to the invention, that the bellows has spacers, in the floor or roof area, between individual bellows frames of the corrugations or folds and between a bellows frame and a fixed point connected to the respective vehicle. These spacers ensure that the individual bellows frames are at a defined distance relative to each other when the vehicle is in the neutral position, i.e. when traveling straight ahead.

Advantageous features and embodiments of the invention may be gathered from a review of this disclosure a review of this disclosure.

In particular, it can be provided that the spacers are disposed approximately in the middle of the roof or floor of the bellows, i.e. near the neutral axis. This means for example that, during a bending movement of the articulated vehicle, there occurs no substantial elongation of the spacers.

Another advantageous feature of the invention is characterized in that the spacers are designed to be elastically yielding. In particular, in conjunction with the feature that the bellows frames are connected to each other by spacers and, at the end, with the vehicle at a fixed point, it is achieved that the bellows frames are lined up at constant intervals in the manner of an elastic chain, meaning that an equal spacing between the bellows frames is thus ensured. The fixed point can be the coach body of the vehicle as such or a bellows frame directly and substantially rigidly connected to the vehicle, wherein the bellows frame forming such a fixed point is one that is directly adjacent to the vehicle. By definition, a central frame between two bellows halves forming a bellows between two vehicles also counts among such bellows frames. In this respect, it is furthermore advantageously provided that the spacers are designed so as to be elastically yielding in the longitudinal direction of the vehicle, in order to be able to yield accordingly in particular during bending movements.

According to another feature of the invention, the spacers can be respectively designed as spring elements, i.e. for example in the form of a tension spring.

However, it has proven to be particularly advantageous, if the spacers are designed as elastic band elements, which connect the individual bellows frames or implement the connection with the fixed point, which can be provided by the coach body of the respective vehicle or by a bellows frame directly adjacent to the coach body of the vehicle and substantially rigidly coupled or permanently attached to the vehicle.

Another embodiment is characterized in that the band elements are designed as a continuous elastic band grasping the corrugations or folds, wherein, at its ends, the band is linked with respectively one fixed point connected to the respective vehicle. In this respect, the fixed point can also be the coach body or an end-side bellows frame connected substantially rigidly with the coach body.

Both embodiments have in common that the elastic band or the band elements are clamped between two bellows frames by the bellows frames. This shows that, during manufacture of the bellows, the installation of the band elements or of the band is integrated in the production of the bellows, namely in that the bellows frames not only hold the strips formed by a coated reinforcement for the folds or corrugations, but furthermore also hold the band elements or the band.

According to another feature, the band or the individual band elements can also be formed by an elastomer or an elastic woven fabric.

BRIEF DESCRIPTION OF THE DRAWINGS

In the following, the invention is exemplarily explained in more detail based on the drawings.

FIG. 3 is a top view onto the roof of a folding bellows according to FIG. 2 and FIG. 2a.

DETAILED DESCRIPTION OF THE PREFERRED EMBODIMENTS

Figure 1:
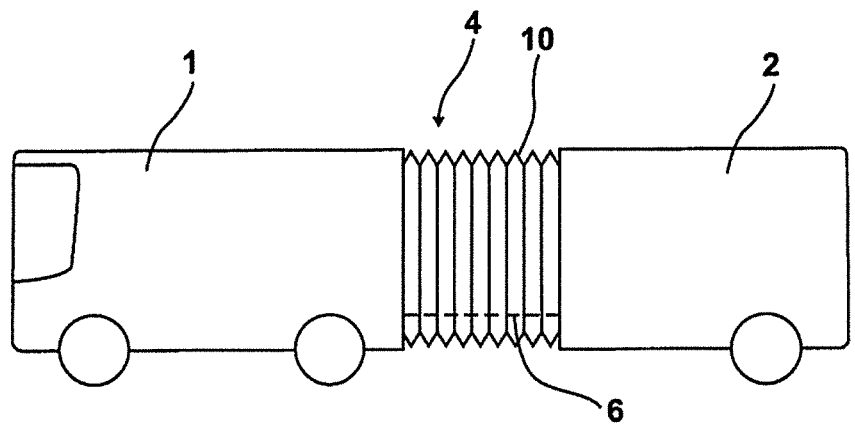
FIG. 1 is a schematic representation of an articulated bus as an articulated vehicle.

According to FIG. 1, the two vehicles 1 and 2 of the articulated vehicle are connected by the gangway labeled 4 as a whole. The gangway 4 comprises a gangway system, for example a bridge or a platform 6, which is enveloped by the bellows 10 in the manner of a tunnel. The gangway system allows persons to move between vehicles 1 and 2.

Figure 2:
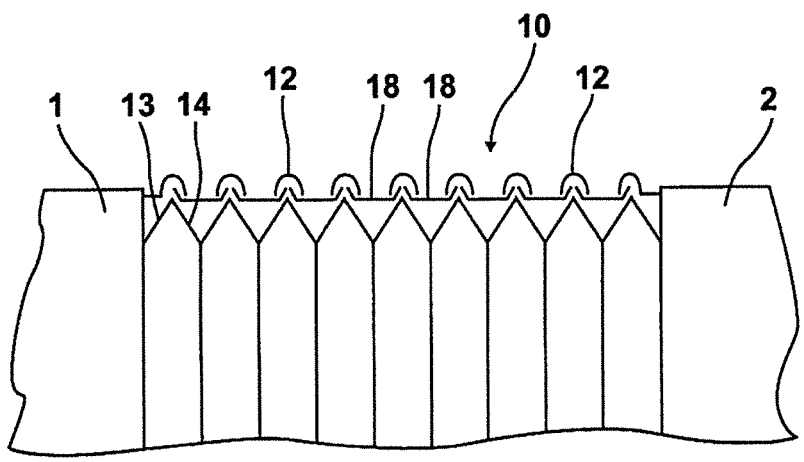
FIG. 2 is a detailed cross-sectional side view of a folding bellows with discrete band elements.

FIG. 2 provides a detailed side view of a first embodiment of the bellows 10 of the gangway 4 according to the invention. In this respect, the individual bellows frames 12 can be seen, which respectively clamp two fabric strips 13 and 14. However, they clamp not only the fabric strips 13 and 14 serving as reinforcements coated with an elastomer but also the band elements 18 serving as spacers. This means that the installation of the band elements 18 is included in the production process.

Figure 2A:
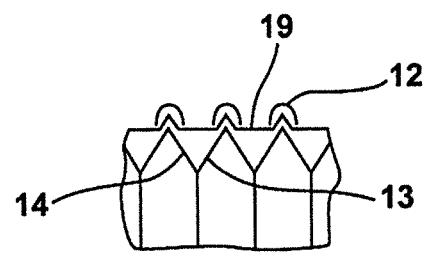
FIG. 2a is a detailed view similar to FIG. 2, wherein the discrete band elements form a continuous band.

FIG. 2a shows a second embodiment, which differs from that of FIG. 2 only by the fact that the individual band elements 18 form a continuous band 19.

Figure 3:
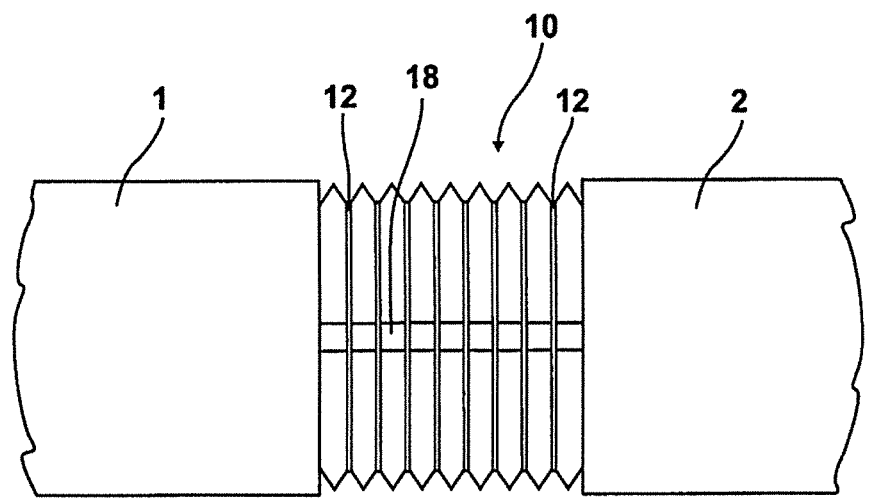

FIG. 3 shows a top view onto the roof of the bellows, which shows that the band 19 or the band elements run approximately in the middle of the roof of the bellows.

It is common to both embodiments that the respectively last bellows frame 12, i.e. the bellows frame that is directly adjacent to the respective vehicle, is connected with the coach body of the respective vehicle, in such a manner that it yields in the longitudinal direction. Therefore, the band elements 18 or the continuous band 19 are connected to the coach body of the respective vehicle, which means that the coach body forms the fixed point.

The invention claimed is:

1. A gangway of the type for extending between two articulately connected vehicles, the vehicles having a fixed point connected thereto, the gangway comprising:
   a gangway system;
   at least one bellows enveloping the gangway system so as to form a tunnel, the bellows having a plurality of spaced apart tunnel-shaped circumferential bellows frames for forming corrugations or folds, the bellows further having a plurality of spacers in a floor or roof area, each spacer disposed between and interconnecting adjacent individual bellows frames or a bellows frame and a fixed point connected to the respective vehicle.

2. A gangway according to claim 1, wherein the spacers are disposed approximately in a middle of the roof area of the bellows.

3. A gangway according to claim 1, wherein the spacers are elastically yielding.

4. A gangway according to claim 3, wherein the spacers are elastically yielding in a longitudinal direction of the vehicle.

5. A gangway according to claim 3, wherein the spacers are spring elements.

6. A gangway according to claim 1, wherein the spacers are elastic band elements.

7. A gangway according to claim 6, wherein the band elements form a continuous elastic band connected to the corrugations or folds, the continuous elastic band having an end connected to the fixed point connected to the respective vehicle.

8. A gangway according to claim 6, wherein the elastic band elements are clamped to the corrugations or folds by the respective bellows frames.

9. A gangway according to claim 6, wherein the band elements are formed by an elastomer or an elastic woven fabric.

* * * * *